(12) United States Patent
Akahori (10) Patent No.: US 11,102,597 B2
(45) Date of Patent: Aug. 24, 2021

(54) PLAYBACK DEVICE

(71) Applicant: LAPIS Semiconductor Co., Ltd., Yokohama (JP)

(72) Inventor: Hiroji Akahori, Yokohama (JP)

(73) Assignee: LAPIS SEMICONDUCTOR CO., LTD., Yokohama (JP)

(*) Notice: Subject to any disclaimer, the term of this patent is extended or adjusted under 35 U.S.C. 154(b) by 0 days.

(21) Appl. No.: 16/825,722

(22) Filed: Mar. 20, 2020

(65) Prior Publication Data

US 2020/0314570 A1 Oct. 1, 2020

(30) Foreign Application Priority Data

Mar. 29, 2019 (JP) .............................. JP2019-069261

(51) Int. Cl.
*H04R 29/00* (2006.01)
*H04R 3/00* (2006.01)
*G06F 3/16* (2006.01)

(52) U.S. Cl.
CPC .......... *H04R 29/001* (2013.01); *G06F 3/165* (2013.01); *H04R 3/00* (2013.01)

(58) Field of Classification Search
CPC .......... H04R 29/001; H04R 3/00; G06F 3/165

USPC ..................................................... 381/56, 59
See application file for complete search history.

(56) References Cited

U.S. PATENT DOCUMENTS

2010/0272309 A1* 10/2010 Buining ................. H04R 19/02
381/394

FOREIGN PATENT DOCUMENTS

JP 2010-128137 A 6/2010

* cited by examiner

*Primary Examiner* — Ammar T Hamid
(74) *Attorney, Agent, or Firm* — Rabin & Berdo, P.C.

(57) ABSTRACT

A playback device includes a playback function unit, a data signal monitoring unit configured to output a data change trigger signal based on a change in the data signal, a clock signal monitoring unit configured to output a clock change trigger signal based on a change in the clock signal, an enable signal monitoring unit configured to output an enabled/disabled state signal that indicates a disabled or enabled state of the enable signal, and a determining unit configured to determine whether the data signal, the clock signal, or the enable signal is properly inputted into the playback function unit or not, based on the data change trigger signal, the clock change trigger signal, and the enabled/disabled state signal.

5 Claims, 8 Drawing Sheets

| TIME VALUE | ENABLE SIGNAL | DETERMINATION |
|---|---|---|
| CHANGE BELOW PRESCRIBED VALUE | ENABLED | NORMAL INPUT STATE |
| NO CHANGE | DISABLED | NORMAL INPUT STATE |
| CHANGE ABOVE PRESCRIBED VALUE | ENABLED | ABNORMAL INPUT STATE |
| NO CHANGE | ENABLED | ABNORMAL INPUT STATE |
| CHANGE BELOW PRESCRIBED VALUE | DISABLED | ABNORMAL INPUT STATE |

| TIME VALUE | ENABLE SIGNAL | DETERMINATION |
|---|---|---|
| TIMERS 26 AND 27 CHANGE BELOW PRESCRIBED VALUE | ENABLED | NORMAL INPUT STATE |
| NO CHANGE IN TIMERS 26 AND 27 | DISABLED | NORMAL INPUT STATE |
| ONE OR BOTH OF TIMERS 26 AND 27 CHANGE ABOVE PRESCRIBED VALUE | ENABLED | ABNORMAL INPUT STATE |
| NO CHANGE IN ONE OR BOTH OF TIMERS 26 AND 27 | ENABLED | ABNORMAL INPUT STATE |
| ONE OR BOTH OF TIMERS 26 AND 27 CHANGE BELOW PRESCRIBED VALUE | DISABLED | ABNORMAL INPUT STATE |

PLAYBACK DEVICE

BACKGROUND OF THE INVENTION

Technical Field

The present invention relates to a playback device that performs a playback of various types of content such as audio and images.

Background Arts

For example, an audio playback device is configured to output audio data stored internally or obtained from outside to a speaker in accordance with a playback instruction given from outside, thereby performing a playback of the audio through the speaker. For example, Japanese Patent Application Laid-open Publication No. 2010-128137 discloses an audio output device that converts digitalized audio data to analog data, and plays the data.

SUMMARY OF THE INVENTION

Outputting various types of information by audio, images, and the like is a very convenient and reliable method to communicate information with a user. Thus, there are a wide range of applications for a playback device of audio recording or images. Examples of the application include playing a movie, giving an alarm at the end of a cooking cycle in cooking appliances, and informing the state of a vehicle to a passenger thereof (risk of collision, for example).

For such a playback device to communicate intended information, it is important that audio recording or images are properly inputted. For example, if audio that represents unintended information is played, or audio is played at an unintended timing, it would mislead users.

The present invention was made in view of this point, and is aiming at providing a playback device that can monitor the input status of content data and a playback signal accompanying the data.

A playback device of the present invention includes: a playback function unit configured to process a data signal indicating data having content to be played back and perform a playback of the content; a data signal monitoring unit configured to monitor a state of the data signal and output a data change trigger signal based on a change in the data signal; a clock signal monitoring unit configured to monitor a state of a clock signal that functions as a reference clock used for processing the data signal in the playback function unit and output a clock change trigger signal based on a change in the clock signal; an enable signal monitoring unit configured to monitor a state of an enable signal that indicates whether a playback of the content is enabled or disabled in the playback function unit and output an enabled/disabled state signal that indicates a disabled or enabled state of the enable signal; and a determining unit configured to determine whether the data signal, the clock signal, or the enable signal is properly inputted into the playback function unit or not, based on the data change trigger signal, the clock change trigger signal, and the enabled/disabled state signal.

A playback device of the present invention includes: a playback function unit configured to process a data signal indicating data having content to be played back and perform a playback of the content; a data signal monitoring unit configured to monitor a state of the data signal and output a data change trigger signal based on a change in the data signal; a clock signal monitoring unit configured to monitor a state of a clock signal that functions as a reference clock used for processing the data signal in the playback function unit and output a clock change trigger signal based on a change in the clock signal; an enable signal monitoring unit configured to monitor a state of an enable signal that is generated inside of the playback function unit and that indicates whether a playback of the content is enabled or disabled in the playback function unit and output an enabled/disabled state signal that indicates a disabled or enabled state of the enable signal; and a determining unit configured to determine whether the data signal or the clock signal is properly inputted into the playback function unit or not, based on the data change trigger signal, the clock change trigger signal, and the enabled/disabled state signal.

By using the monitoring device of the present invention, it is possible to accurately determine and monitor the input status of signals, based on the overall input status of various signals used for a playback, in addition to signals that represent data.

DETAILED DESCRIPTION OF THE EMBODIMENTS

Below, the embodiments of the present invention will be explained in detail.

Embodiment 1

Figure 1:
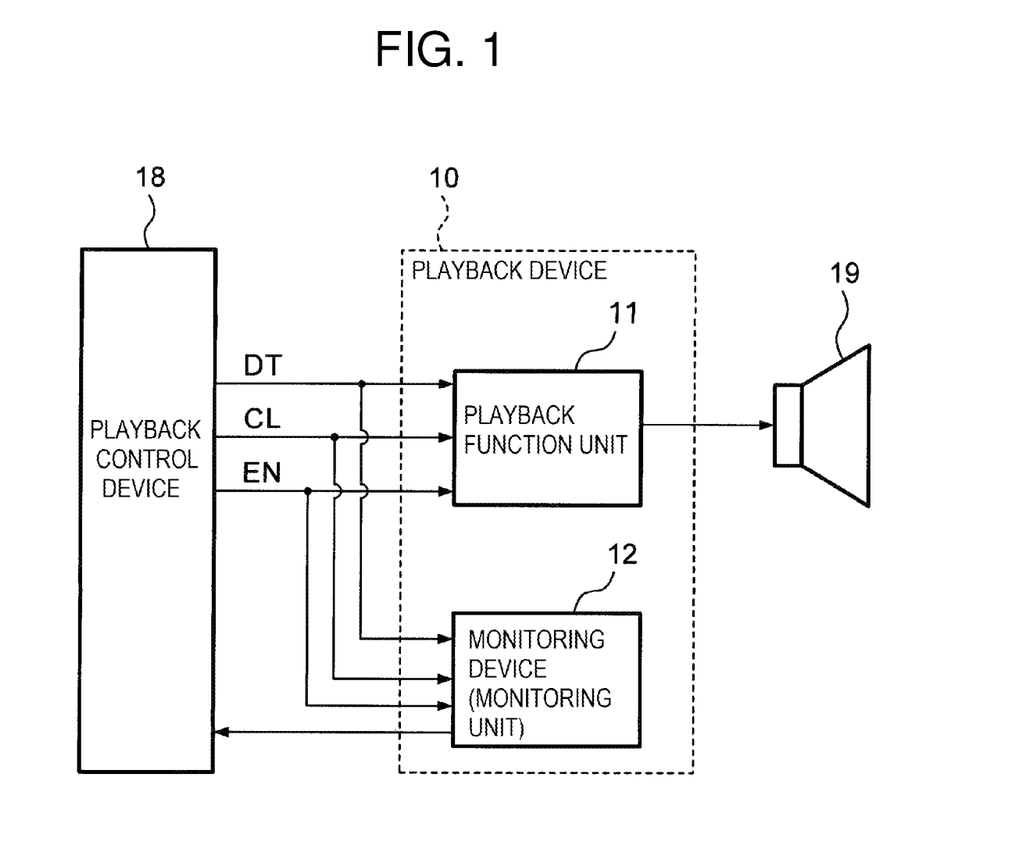
FIG. 1 is a diagram showing a configuration of a playback device equipped with a monitoring device of Embodiment 1.

FIG. 1 is a diagram showing a configuration of a playback device 10 of Embodiment 1. The playback device 10 is an apparatus configured to play back various types of content such as images, videos, and audio, for example. Below, an example in which the playback device 10 is an audio playback device will be explained.

The playback device 10 receives, from an external playback control device 18, an instruction to play back audio that represents a certain type of information, the instruction including data that indicates the audio (will also be referred to as audio data below). The playback device 10 generates an audio signal that represents the audio data, and supplies the audio signal to a speaker 19. For example, the playback device 10 is constituted of LSI (large-scale integration).

In this embodiment, the playback control device 18 generates a data signal DT containing audio data, a clock signal CL that functions as a reference clock used by the playback device 10 when processing the data signal DT, and an enable signal EN that indicates whether audio playback is enabled or disabled in the playback device 10, and supplies those signals to the playback device 10. In embodiments of the invention, the playback control device 18 includes at least one processor, and may include corresponding memory, logic and other active and passive processing elements to generated the data signal DT, clock signal CL, and enable signal EN to control the playback device 10.

The playback device 10 receives a data signal DT, a clock signal CL, and an enable signal EN, and generates audio signals for outputting audio data from the speaker 19. The playback device 10 includes a playback function unit 11 that performs a playback operation of the audio data. The playback function unit 11 includes one or more processors for receiving the audio data in the data signal DT and converting the audio data to signals that, upon being transmitted to the speaker 19, generate sound based on the audio data.

In this embodiment, the playback function unit 11 receives the data signal DT, and generates an audio signal for a playback. The playback device 10 has stored therein audio data that is used as a basis to generate an audio signal (will also be referred to as basic audio data, below).

In this embodiment, the playback function unit 11 selectively reads out the basic audio data stored in the playback device 10, and generates an audio signal that represents information indicated by the data signal DT. For example, the basic audio data may be audio data corresponding to each letter of an alphabet of a particular language, such as the 50 letters of the Japanese alphabet.

In one embodiment, the playback function unit 11 has an amplifier (not shown in the figure) that amplifies an audio signal, and is configured to use the amplified audio signal as a driving signal for the speaker 19 and supplying the driving signal to the speaker 19. Also, the playback function unit 11 adjusts the volume and quality of the audio outputted from the speaker 19 by adjusting the driving signal, for example.

Further, the playback function unit 11 performs operations to generate and output the driving signal in accordance with the clock signal CL. The operation of the playback function unit 11 to generate the driving signal, or in other words, the playback operation of the playback function unit 11 is performed while the signal level of the enable signal inputted to the playback function unit 11 is at a logic level that enables the playback function of the playback function unit 11. As described above, the playback device 10 performs a playback of audio data, for example.

The playback device 100 also has a monitoring device 12, as a monitoring unit, that monitors various signals to be inputted into the playback function unit 11 such as the data signal DT, the clock signal CL, and the enable signal EN, thereby checking whether or not the signals are properly inputted from the playback control unit 18 to the playback function unit 11.

The monitoring device 12 receives the signals to be inputted from the playback control device 18 to the playback device 10 (data signal DT, clock signal CL, and enable signal EN in this embodiment), and monitors the state of each signal, thereby monitoring the input state of the signals to be inputted to the playback device 10. The monitoring device 12 outputs, to the playback control device 18, the results of monitoring the input state of the signals to the playback device 10. In some cases, the monitoring results may be outputted to an external device other than the playback control device 18 that controls the playback function unit 11 (not shown in the figure).

Figure 2:
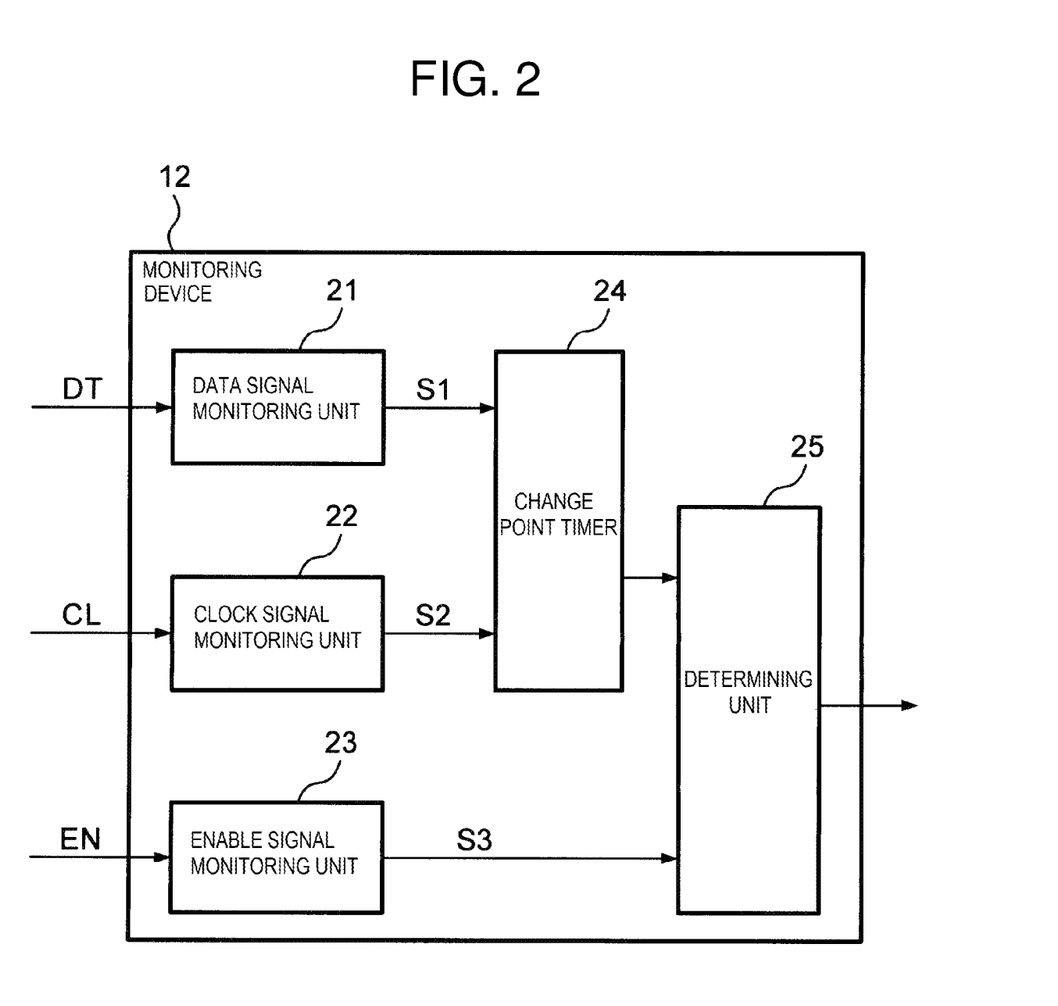
FIG. 2 is a block diagram of the monitoring device of Embodiment 1.

FIG. 2 is a block diagram showing a detailed configuration of the monitoring device 12. In this embodiment, the monitoring device 12 has a data signal monitoring unit 21 that monitors the status of the data signal DT. The data signal monitoring unit 21 detects a change in data signal DT (change points, for example) and outputs a trigger signal S1 based on a change in data signal DT (referred to as a data change trigger signal, below).

Examples of the change point of the data signal DT include a timing at which the level of the data signal DT goes up when the apparatus is switched from a silent state to an audio output state, or a timing at which the signal level of the data signal DT changes at a degree greater than a prescribed degree due to a change in volume or a change in a sound corresponding to a different letter of the alphabet being output as audio data.

In this embodiment, the monitoring device 12 has a clock signal monitoring unit 22 that monitors the status of the clock signal CL. In this embodiment, the clock signal monitoring unit 22 detects a change in clock signal CL (change points, for example). In this embodiment, the clock signal monitoring unit 22 outputs a trigger signal S2 based on a change in clock signal (will be referred to as a clock change trigger signal below). Examples of the change point of the clock signal CL include ramp-up and ramp-down of the clock signal CL.

In this embodiment, the monitoring device 12 has an enable signal monitoring unit 23 that monitors the status of the enable signal EN. In this embodiment, the enable signal monitoring unit 23 determines whether the signal level of the enable signal EN is at a logic level that enables the playback function of the playback function unit 11, or at a logic level that disables the playback function of the playback function unit 11

The enable signal monitoring unit 23 outputs a signal S3 that indicates whether the enable signal EN is enabling or disabling the playback function unit (will be referred to as an enabled/disabled state signal). That is, the enable signal monitoring unit 23 monitors the enable signal to see if the playback control device 18 has output an instruction to perform a playback of the audio data to the playback device 10 or not.

Next, the monitoring device 12 has a change point timer 24 that repeatedly resets and counts up based on the data change trigger signal S1 and the clock change trigger signal S2. The change point timer 24 outputs a counter value that indicates the results of the resetting and counting up.

In this embodiment, when a change in either data signal DT or clock signal CL is detected by the data signal monitoring unit 21 or the clock signal monitoring unit 22, the change point timer 24 starts counting up from that change point, which is used as a reset point or a count-up starting point.

If a change in the other signal, among the data signal DT and the clock signal CL, differing from the signal that has triggered the count-up is newly detected, the change point timer 24 starts counting up using the newly detected change point as a reset point or count-up starting point.

For example, if a change in clock signal CL (as indicated by a change in the clock change trigger signal S2) is detected while the change point timer 24 is counting up for a change point of the data signal DT, which was triggered by detection of a change in data signal DT (as indicated by the data change trigger signal S1), the change point timer 24 resets the counter value, and starts counting up for the change point of the clock signal CL until a change in data signal DT is newly detected.

The monitoring device 12 has a determining unit 25 that determines whether the data signal DT, clock signal CL, and enable signal EN are normally inputted into the playback function unit 11 of the playback device 10 or not, based on the state of the counter value output from the change point timer 24 and the enabled/disabled state signal S3.

In this embodiment, the determining unit 25 sends the determination result to the playback control device 18. If receiving a notification of the determination result indicating that the data signal DT or the clock signal CL is not properly inputted into the playback function unit 11, for example, the playback control device 18 may control the playback function unit 11 such that audio is not outputted from the speaker 19 or the volume of audio outputted from the speaker 19 is lowered.

Although not shown in the figure, if the determining unit 25 determines that the data signal DT or the clock signal CL is not properly inputted into the playback function unit 11, for example, the determining unit 25 may directly control the playback function unit 11 such that audio is not outputted from the speaker 19 or the volume of audio outputted from the speaker 19 is lowered.

Figure 3:
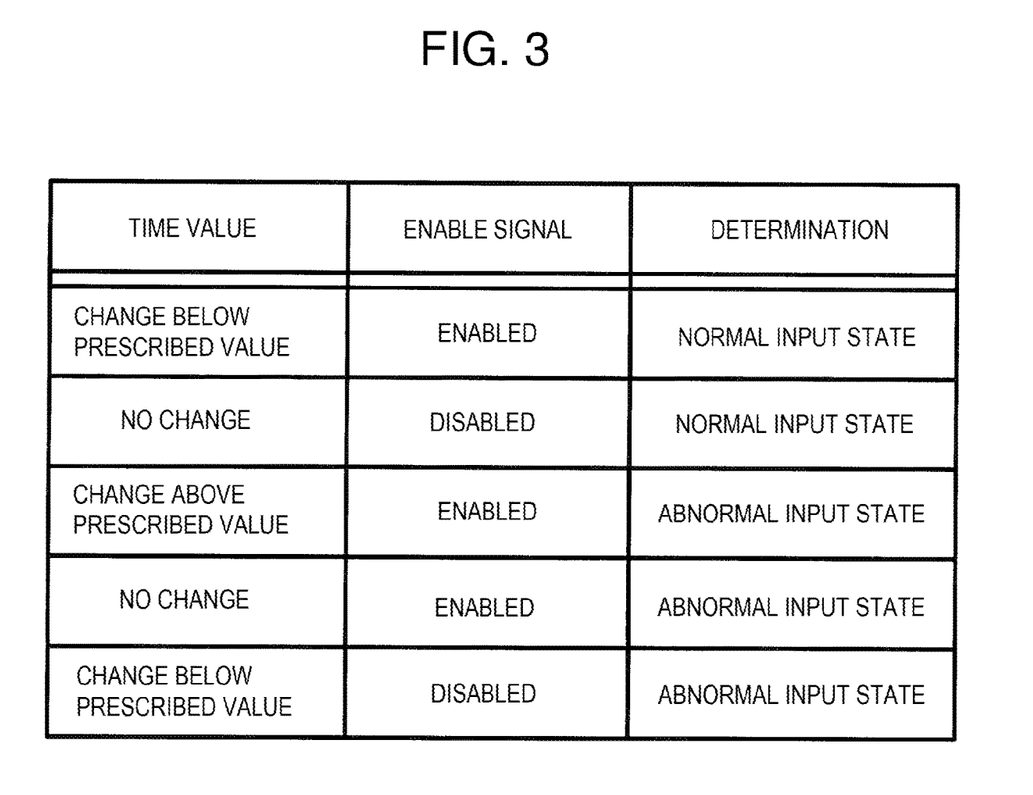
FIG. 3 is a diagram showing an example of a status determination table of the monitoring device of Embodiment 1.

FIG. 3 is a diagram showing an example of a table used by the determining unit 25 of the monitoring device 12 to determine the input state of the data signal DT, the clock signal CL, and the enable signal EN (will be referred to as a state determining table below). The table may take the form of data stored in memory, or alternatively, the table may be implemented as logic circuitry that generates a first output level for the "normal input state" determination and a second output level of the "abnormal input state" determination. In this embodiment, the determining unit 25 determines the input state of the signals into the playback device 10 based on both the counter value (timer value below) of the change point timer 24 and the state of the enable signal EN.

In this embodiment, if the timer value keeps changing without going over a prescribed value during a period in which the enable signal EN indicates an enabled state, the determining unit 25 determines that the data signal DT, the clock signal CL and the enable signal EN are properly inputted into the playback device 10.

If the timer value does not change during a period in which the enable signal EN indicates a disabled state, the determining unit 25 determines that the data signal DT, the clock signal CL, and the enable signal EN are not inputted into the playback device 10, (audio data is not supplied to be outputted, or an instruction to output audio data is not issued). In this case, the determining unit 25 determines that the playback function unit 11 is in a normal non-playback state, for example.

If the timer value goes over a prescribed value during (at least part of) a period in which the enable signal EN indicates an enabled state, the determining unit 25 determines that the data signal DT or the clock signal CL is not properly inputted into the playback device 10, and that the playback function unit 11 is in an abnormal playback state.

For example, when the data signal DT and the clock signal CL are both properly inputted, the timer value keep changing without going over a prescribed value. On the other hand, if the input of the data signal DT or the clock signal CL is discontinued, for example, the change point timer 24 keeps counting up, which makes the timer value go over a prescribed value. The determining unit 25 determines whether the input state of the data signal DT or clock signal CL is normal or abnormal.

Next, if the timer value does not change over a prescribed period of time during a period in which the enable signal EN indicates an enabled state, the determining unit 25 determines that the data signal DT or the clock signal CL is not properly inputted into the playback device 10, and that the playback function unit 11 is in an abnormal playback state. If the timer value does not change, then it can mean that either the data signal DT or the clock signal CL is not inputted.

If the timer value keeps changing within a prescribed range during a period in which the enable signal EN indicates a disabled state, the determining unit 25 determines that the data signal DT or the clock signal CL is properly inputted into the playback device 10, but the enable signal EN is not properly inputted, and that the playback function unit 11 is in an abnormal playback state. This is because, in some cases, the playback function unit 11 does not switch to the enabled state at a timing when audio data should be played.

The threshold value and a non-change period for the timer value can be adjusted in various manners. For example, if audio data has a normal silent period, the timer value goes up to a certain extent, and then does not change at all for a certain period of time. By taking into consideration those situations in setting the judgment criteria for the timer value, the determining unit 25 can detect an abnormality with a higher degree of accuracy.

As described above, in this embodiment, the monitoring device 12 monitors whether the data signal DT, the clock signal CL, and the enable signal EN are inputted properly into the playback function unit 11 or not, based on the input state of those signals. This way, the monitoring device 12 can monitor and determine the data input state into the playback device 10 and the data playback state of the playback device 10 accurately.

In this embodiment, the configuration in which the monitoring device 12 has the change point timer 24, and uses a timer value outputted from this timer 24 to monitor the input state of the signals inputted into the playback function unit 11 was explained. However, the monitoring device 12 does not have to have the change point timer 24 as long as it has the data signal monitoring unit 21, the clock signal monitoring unit 22, the enable signal monitoring unit 23, and the determining unit 25.

In this case, the determining unit 25 need to be configured such that the number of changes in data signal or clock signal is determined based on the data change trigger signal S1 and the clock change trigger signal S2, for example.

Also, in this case, the playback function unit 11 can determine that the data signal DT, the clock signal CL, or the enable signal EN is not properly inputted to the playback function unit 11 if one of the following situations occurs: the data signal DT or the clock signal CL changes more frequently than a prescribed number of times during a period in which the enable signal EN indicates an enabled state; the data signal DT or the clock signal CL does not change over a prescribed period of time during a period in which the enable signal EN indicates an enabled state; and the data signal DT and the clock signal CL change a certain number of times within a prescribed range during a period in which the enable signal EN indicates a disabled state.

In this embodiment, an example in which the monitoring device 12 is incorporated in the playback device 10 was explained. However, the monitoring device 12 may be provided outside of the playback device 10. The monitoring device 12 can still perform the same monitoring operation by obtaining various types of signals inputted into the playback device 10 or various types of signals for data processing generated within the playback device 10.

As describe above, the playback device 10 includes: a playback function unit 11 configured to process the data signal DT indicating data having content to be played back and perform a playback of the content; the data signal monitoring unit 21 configured to monitor a state of the data signal DT and output the data change trigger signal S1 based on a change in the data signal DT; the clock signal monitoring unit 22 configured to monitor a state of the clock signal CL that functions as a reference clock used for processing the data signal DT in the playback function unit 11 and output the clock change trigger signal S2 based on a change in the clock signal CL; an enable signal monitoring unit 23 configured to monitor a state of the enable signal EN that indicates whether a playback of the content is enabled or disabled in the playback function unit 11 and output the enabled/disabled state signal S3 that indicates a disabled or enabled state of the enable signal EN; and the determining unit 25 configured to determine whether the data signal DT, the clock signal CL, or the enable signal EN is properly inputted into the playback function unit 11 or not, based on the data change trigger signal S1, the clock change trigger signal S2, and the enabled/disabled state signal S3. Therefore, it is possible to provide the playback device 10 that can monitor an input state of content data and playback signals that accompany the content data.

Embodiment 2

Figure 4:
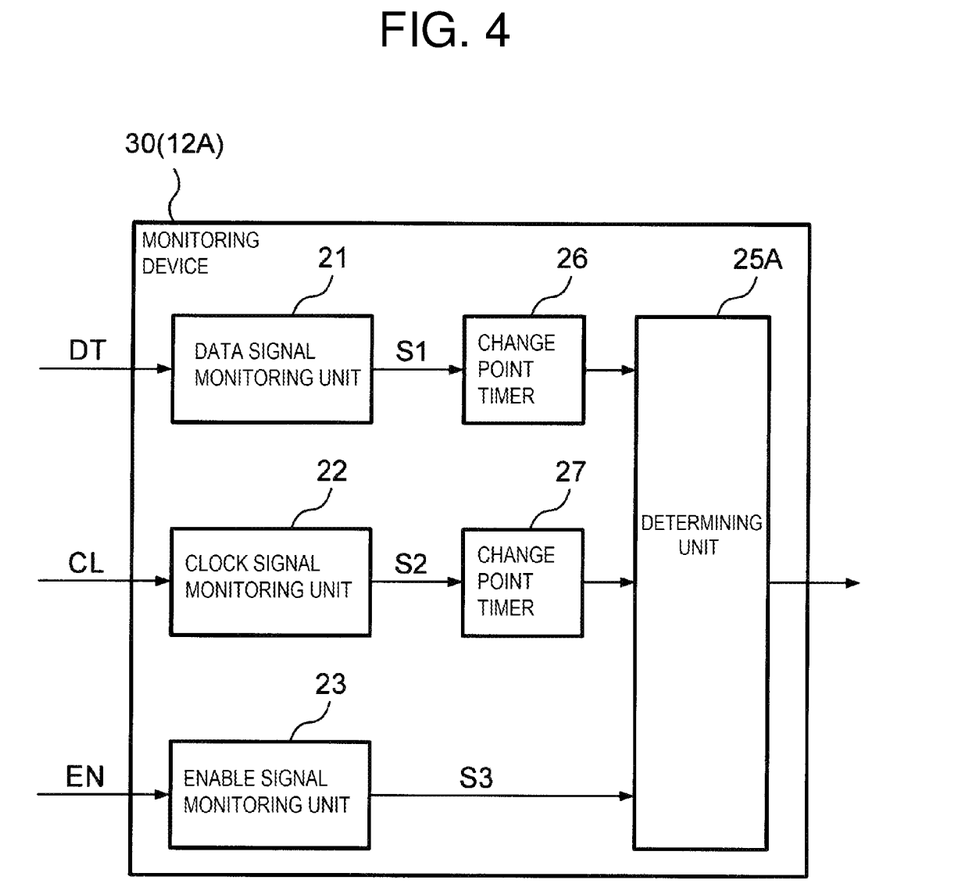
FIG. 4 is a block diagram of the monitoring device of Embodiment 2.

FIG. 4 is a block diagram of a monitoring device 12A of a playback device 30 of Embodiment 2. The playback device 30 has the same configuration as that of the playback device 10 except for the configuration of the monitoring device 12A. The monitoring device 12A has the same configuration as that of the monitoring device 12 except that there are two timers (first and second timers 26 and 27) and that a determining unit 25A determines an input state of the signals based on the counter values of the first and second timers 26 and 27.

In this embodiment, the monitoring device 12A has the first timer 26 that resets and counts up based on the data change trigger signal S1 and that outputs a counter value that indicates the results of the reset and count-up, and the second timer 27 that resets and counts up based on the clock change trigger signal S2 and that outputs a counter value that indicates the results of the reset and count-up.

The monitoring device 12A has the determining unit 25A that determines whether the data signal DT, the clock signal CL, and the enable signal EN are properly inputted into the playback function unit 11, based on the counter values of the first and second timers 26 and 27 and the enabled/disabled state signal S3, and sends the determination results to the playback control device 18 (see FIG. 1).

In this embodiment, the first timer 26 and the second timer 27 reset and count up independently of each other. Also, in this embodiment, the first timer 26 and the second timer 27 reset and start counting up at a certain interval or at a prescribed timing. A plurality of timers that function independently of each other may be provided for respective input signals as in the monitoring device 12A.

Figure 5:
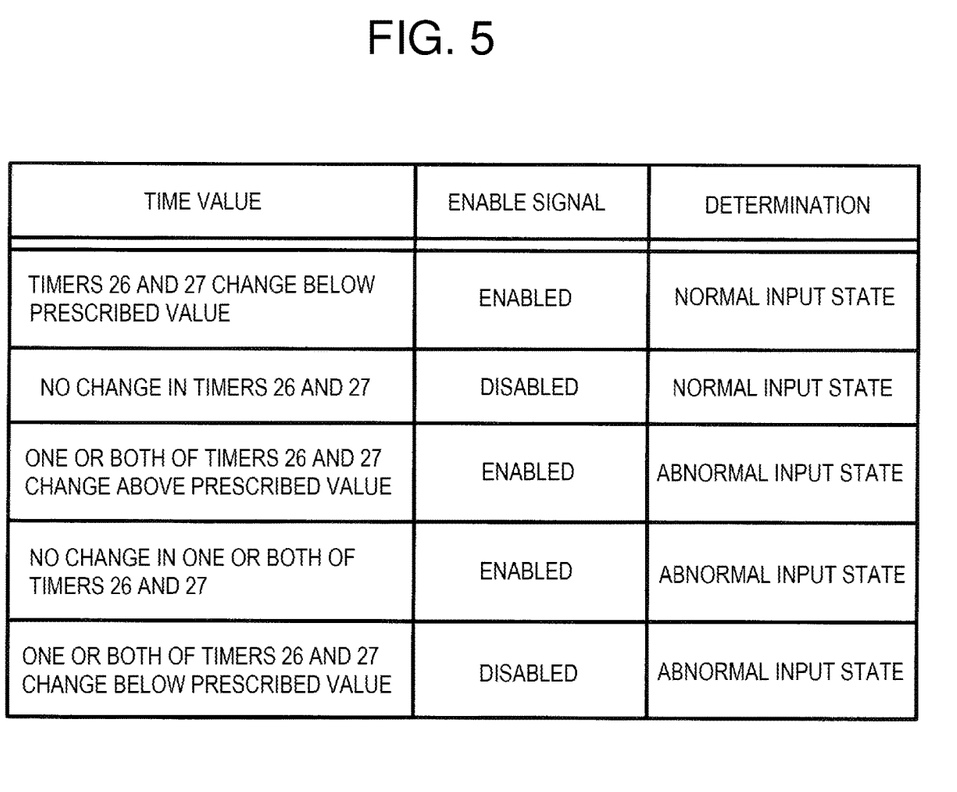
FIG. 5 is a diagram showing an example of a status determination table of the monitoring device of Embodiment 2.

FIG. 5 is a diagram showing an example of a status determination table used by the determining unit 25A to determine the input state of the signals into the playback function unit 11. The table may take the form of data stored in memory, or alternatively, the table may be implemented as logic circuitry that generates a first output level for the "normal input state" determination and a second output level of the "abnormal input state" determination. First, in this embodiment, if the timer values of the first and second timers 26 and 27 keep changing without going over a prescribed value during a period in which the enable signal EN indicates an enabled state, the determining unit 25A determines that the data signal DT, the clock signal CL and the enable signal EN are properly inputted into the playback function unit 11.

Also, if the timer values of the first and second timers 26 and 27 do not change during a period in which the enable signal EN indicates a disabled state, the determining unit 25A determines that the data signal DT, the clock signal CL and the enable signal EN are not inputted into the playback function unit 11, and that the playback function unit 11 is in a normal non-playback state.

On the other hand, if at least one of the timer values of the first and second timers 26 and 27 changes to an extent that exceeds a prescribed value during (at least part of) a period in which the enable signal EN indicates an enabled state, the determining unit 25A determines that the data signal DT, the clock signal CL or the enable signal EN is not properly inputted into the playback function unit 11, and that the playback function unit 11 is in an abnormal playback state.

For example, if the timer value of the first timer 26 changes to an extend that exceeds a prescribed value, it is possible that abnormal data signal DT is inputted. If the timer value of the second timer 27 changes to an extend that exceeds a prescribed value, it is possible that abnormal clock signal CL is inputted. The determining unit 25A detects such a state as an abnormal signal input state, for example.

If at least one of the timer values of the first and second timers 26 and 27 does not change over a prescribed period of time during a period in which the enable signal EN indicates an enabled state, the determining unit 25A determines that the data signal DT, the clock signal CL or the enable signal EN is not properly inputted into the playback function unit 11, and that the playback function unit 11 is in an abnormal playback state. In this case, it is possible that the output of the signal corresponding to the timer in which the timer value has not changed for a prescribed period of time is discontinued.

If the timer values of the first and second timers 26 and 27 keep changing within a prescribed range during a period in which the enable signal EN indicates a disabled state, the determining unit 25A determines that the data signal DT or the clock signal CL is properly inputted into the playback device 10, but the enable signal EN is not, and that the playback function unit 11 is in an abnormal non-playback state. This could be caused by the playback function unit 11 not switching to the enabled state at a timing when audio data should be played.

As described above, the monitoring device 12A may have the first and second timers 26 and 27 corresponding to the respective data signal DT and clock signal CL. This makes it possible to accurately determine the input state of the signals inputted into the playback function unit 11 and the playback state of the playback device 30.

Embodiment 3

Figure 6:
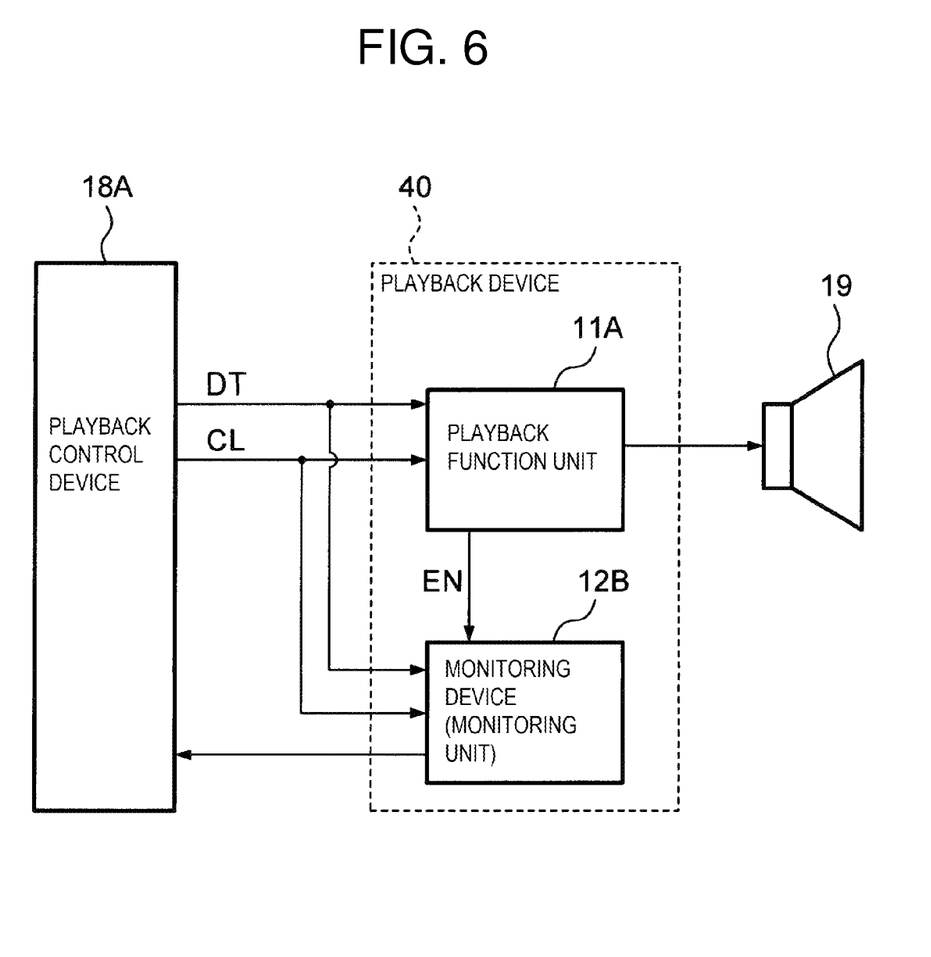
FIG. 6 is a diagram showing a configuration of a playback device equipped with a monitoring device of Embodiment 3.

FIG. 6 is a partial block diagram of a playback device 40 of Embodiment 3. The playback device 40 has the same configuration as that of the playback device 10 except for the configurations of a playback function unit 11A and a monitoring device 12B. In this embodiment, the playback control device 18A has a configuration differing from the playback control device 18.

In this embodiment, the playback control device 18A supplies only the data signal DT and the clock signal CL to the playback device 40. The playback function unit 11A switches between the enabled state and disabled state by receiving the data signal DT and the clock signal CL. That is, the enable signal EN is generated inside of the playback function unit 11A. In this embodiment, the enable signal EN may be generated based on signal levels of the data signal DT, in combination with states of the clock signal CL, such that when a predetermined logical relationship exists, the enable signal EN is asserted.

Figure 7:
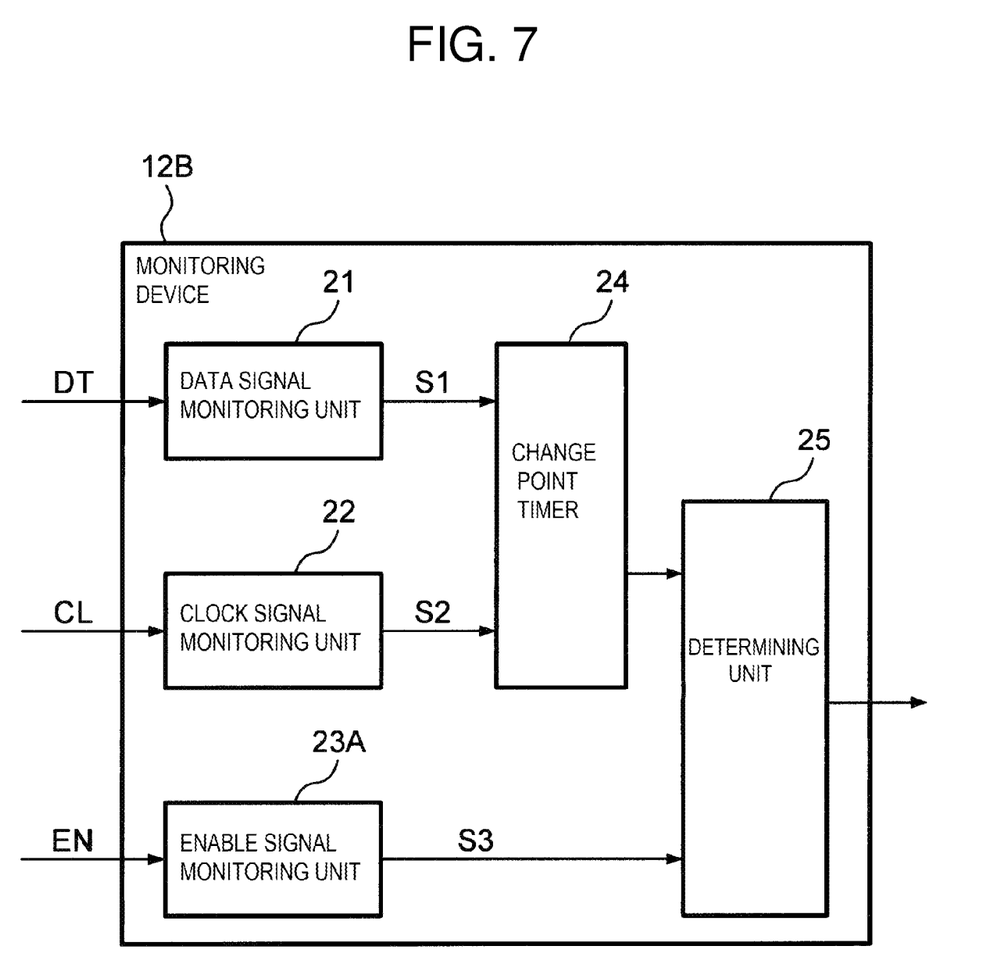
FIG. 7 is a block diagram of the monitoring device of Embodiment 3.

FIG. 7 is a block diagram of the monitoring device 12B. In this embodiment, the enable signal monitoring unit 23A of the monitoring device 12B receives the enable signal EN from the playback function unit 11A, thereby monitoring the state of this enable signal EN.

In this embodiment, the determining unit 25 determines whether the data signal DT or the clock signal CL is properly inputted into the playback function unit 11A or not based on the counter value of the change point timer 24 and the enabled/disabled state signal S3.

For example, the monitoring device 12B may determine whether the data signal DT or the clock signal CL is properly inputted into the playback function unit 11A or not using the state determining table shown in FIG. 3, for example, in a manner similar to the monitoring device 12. As described above, even when the playback function unit 11A is configured to switch between the enabled state and disabled state internally, the input state of the signals into the playback function unit 11A can be monitored in the same manner.

As describe above, in this embodiment, the playback device 40 includes: a playback function unit 11A configured to process the data signal DT indicating data having content to be played back and perform a playback of the content; the data signal monitoring unit 21 configured to monitor a state of the data signal DT and output the data change trigger signal S1 based on a change in the data signal DT; the clock signal monitoring unit 22 configured to monitor a state of the clock signal CL that functions as a reference clock used for processing the data signal DT in the playback function unit 11A and output the clock change trigger signal S2 based on a change in the clock signal CL; an enable signal monitoring unit 23A configured to monitor a state of the enable signal EN that is generated within the playback function unit 11A and that indicates whether a playback of the content is enabled or disabled in the playback function unit 11A and output the enabled/disabled state signal S3 that indicates a disabled or enabled state of the enable signal EN; and the determining unit 25 configured to determine whether the data signal or the clock signal CL is properly inputted into the playback function unit 11A or not, based on the data change trigger signal S1, the clock change trigger signal S2, and the enabled/disabled state signal S3 and send the determination results to the playback control device 18A. Therefore, it is possible to provide the playback device 40 that can monitor an input state of content data and playback signals that accompany the content data.

Embodiment 4

Figure 8:
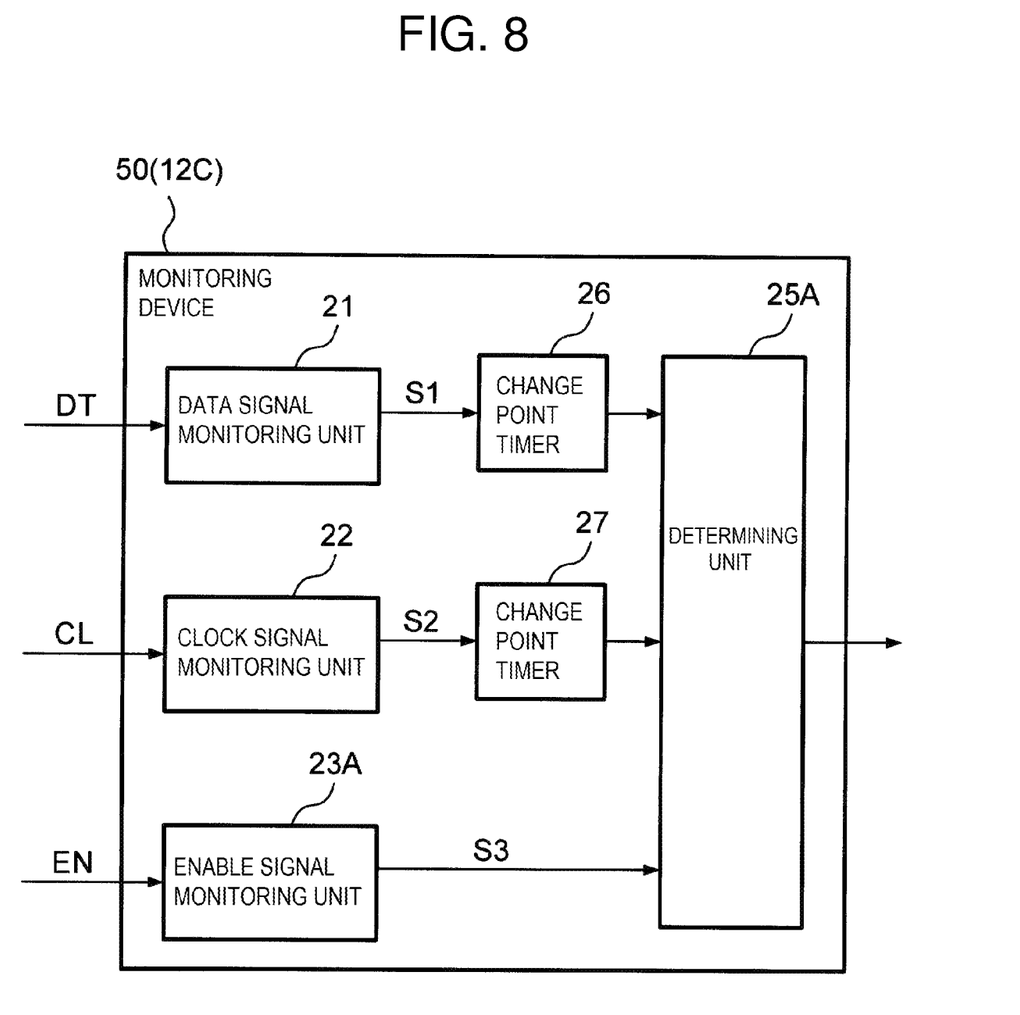
FIG. 8 is a block diagram of the monitoring device of Embodiment 4.

FIG. 8 is a partial block diagram of a playback device 50 of Embodiment 4. The playback device 50 has the same configuration as that of the playback device 40 except for the configuration of a monitoring device 12C. The monitoring device 12C has the same configuration as that of the monitoring device 12B except for having the first and second timers 26 and 27, and a determining unit 25A that determines an input state of the signals based on the counter values of the first and second timers 26 and 27. The monitoring device 12C has a configuration obtained by combining the monitoring device 12A (Embodiment 2) and the monitoring device 12B (Embodiment 3).

In this embodiment, the monitoring device 12C has the first timer 26 that resets and counts up based on the data change trigger signal S1, and the second timer 27 that resets and counts up based on the clock change trigger signal S2 as in the monitoring device 12A.

The monitoring device 12C has an enable signal monitoring unit 23A that monitors the state of the enable signal EN by receiving the enable signal EN from the playback function unit 11A, and that outputs the enabled/disabled state signal S3 that indicates whether the enable signal EN indicates an enabled state or disabled state.

Also, the monitoring device 12C has a determining unit 25A that determines whether the data signal DT or the clock signal CL is properly inputted into the playback function unit 11A or not, based on the timer values of the first and second timers 26 and 27 and the enabled/disabled state signal S3, and sends the determination results to the playback control device 18A (see FIG. 6). For example, the monitoring device 12C may determine whether the data signal or the clock signal is properly inputted into the playback function unit 11A or not using the state determining table shown in FIG. 5, for example, in a manner similar to the monitoring device 12A.

As described above, in this embodiment, a change point of the data signal DT and clock signal CL is counted independently by the first and second timers 26 and 27, and the state of the playback function unit 11A is monitored based on the enable signal EN that is generated inside of the playback function unit 11A. In this case as well, the input state of the signals inputted into the playback function unit 11A can be accurately monitored and determined.

What is claimed is:

1. A playback device, comprising:
   a playback function unit configured to process a data signal indicating data having content to be played back and perform a playback of the content;
   a data signal monitoring unit configured to monitor a state of the data signal and output a data change trigger signal based on a change in the data signal;
   a clock signal monitoring unit configured to monitor a state of a clock signal that functions as a reference clock used for processing the data signal in the playback function unit and output a clock change trigger signal based on a change in the clock signal;
   an enable signal monitoring unit configured to monitor a state of an enable signal that indicates whether a playback of the content is enabled or disabled in the playback function unit and output an enabled/disabled signal that indicates an enabled or disabled state of the enable signal; and
   a determining unit configured to determine whether each of the data signal, the clock signal, and the enable signal is properly inputted into the playback function unit, based on the data change trigger signal, the clock change trigger signal, and the enabled/disabled state signal.

2. The playback device according to claim 1, wherein the determining unit determines a number of changes in data signal or clock signal based on the data change trigger signal or the clock change trigger signal, and determines that the data signal, the clock signal, or the enable signal is not properly inputted into the playback function unit based on determining one of the following: the data signal or the clock signal changes more frequently than a prescribed number during a period in which the enable signal indicates an enabled state; the data signal or the clock signal does not change over a prescribed period of time during a period in which the enable signal indicates an enabled state; and the data signal and the clock signal change within a prescribed period of time during a period in which the enable signal indicates a disabled state.

3. The playback device according to claim 2, further comprising a timer configured to reset and count up based on the data change trigger signal and the clock change trigger signal, and output a counter value indicating results of the reset and count-up, wherein the determining unit determines whether each of the data signal, the clock signal, and the enable signal is properly inputted into the playback function unit, based on the counter value of the timer and the enabled/disabled state signal.

4. The playback device according to claim 2, further comprising: a first timer configured to reset and count up based on the data change trigger signal and output a first counter value indicating results of the reset and count-up of the first timer; and a second timer configured to reset and count up based on the clock change trigger signal and output a second counter value indicating results of the reset and count-up of the second timer, wherein the determining unit determines whether each of the data signal, the clock signal, and the enable signal is properly inputted into the playback function unit based on the first and second counter values of the respective first and second timers and the enabled/disabled state signal.

5. A playback device, comprising: a playback function unit configured to process a data signal indicating data having content to be played back and perform a playback of the content;

a data signal monitoring unit configured to monitor a state of the data signal and output a data change trigger signal based on a change in the data signal;

a clock signal monitoring unit configured to monitor a state of a clock signal that functions as a reference clock used for processing the data signal in the playback function unit and output a clock change trigger signal based on a change in the clock signal;

an enable signal monitoring unit configured to monitor a state of an enable signal that is generated inside of the playback function unit and that indicates whether a playback of the content is enabled or disabled in the playback function unit and output an enabled/disabled state signal that indicates an enabled or disabled state of the enable signal; and a determining unit configured to determine whether the data signal and the clock signal are properly inputted into the playback function unit based on the data change trigger signal, the clock change trigger signal, and the enabled/disabled state signal.

\* \* \* \* \*